Nov. 8, 1960 R. L. ECKERT ET AL 2,959,024
REMOTELY OPERABLE FLUID NOZZLE
Filed July 18, 1958 6 Sheets-Sheet 1

INVENTORS.
ROBERT L. ECKERT
DAVID A. REED, Jr.
BY *Noel H. Conway*
AGENT

Nov. 8, 1960    R. L. ECKERT ET AL    2,959,024
REMOTELY OPERABLE FLUID NOZZLE
Filed July 18, 1958    6 Sheets-Sheet 2

INVENTORS.
ROBERT L. ECKERT
DAVID A. REED, Jr.
BY Noel G. Conway
AGENT

INVENTORS.
ROBERT L. ECKERT
DAVID A. REED, Jr.
BY

AGENT

INVENTORS.
ROBERT L. ECKERT
DAVID A. REED, Jr.

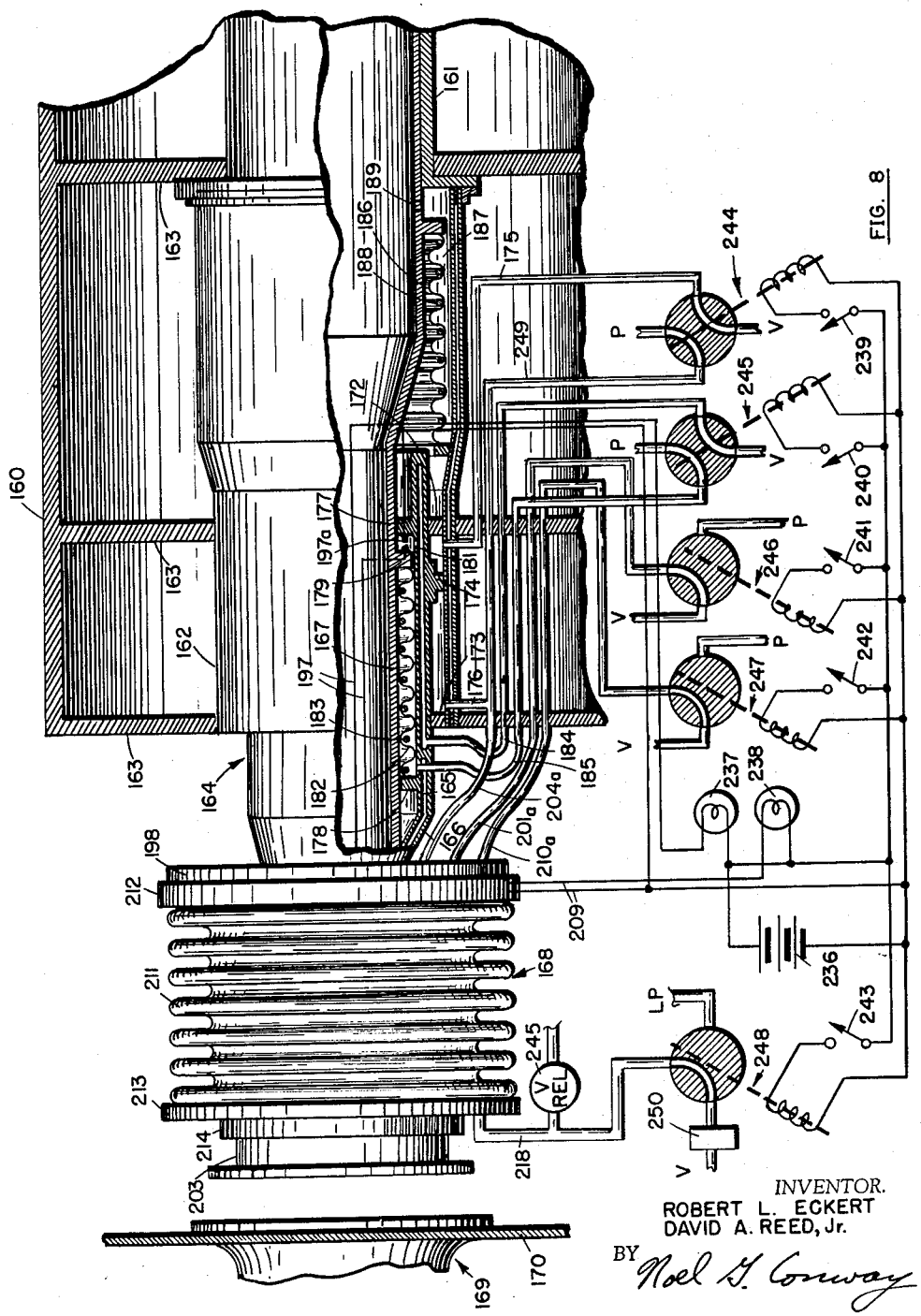

Nov. 8, 1960   R. L. ECKERT ET AL   2,959,024
REMOTELY OPERABLE FLUID NOZZLE
Filed July 18, 1958   6 Sheets-Sheet 6
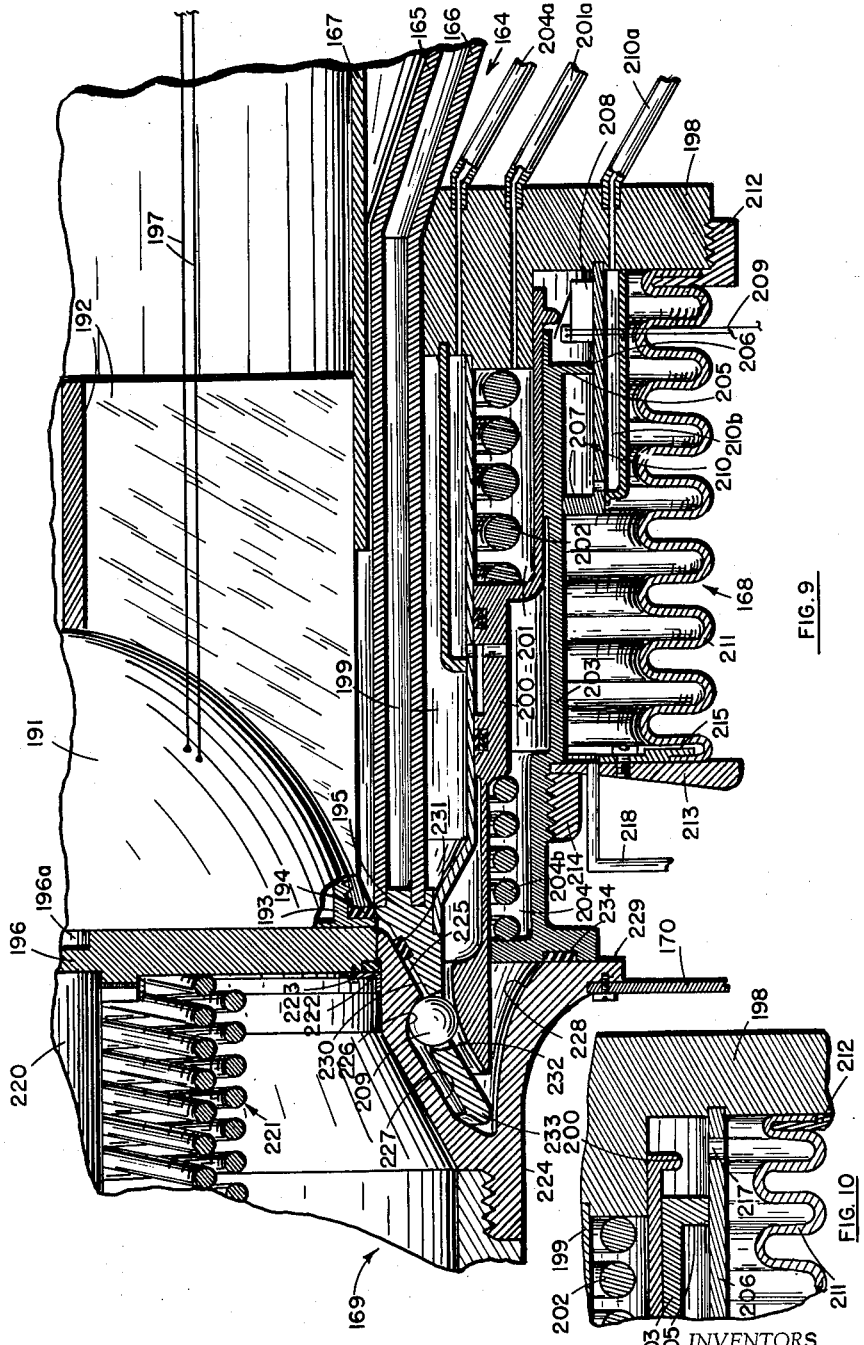
INVENTORS.
ROBERT L. ECKERT
BY DAVID A. REED, Jr.
*Noel G. Conway*
AGENT United States Patent Office 2,959,024
Patented Nov. 8, 1960

2,959,024
REMOTELY OPERABLE FLUID NOZZLE

Robert L. Eckert, Long Beach, and David A. Reed, Jr., Anaheim, Calif., assignors to North American Aviation, Inc.

Filed July 18, 1958, Ser. No. 749,511

16 Claims. (Cl. 62—55)

This invention relates to new and useful improvements in fluid handling nozzles.

This invention also relates to fluid handling nozzles which may be operated from a remote position and have means to prevent unsafe operation.

More particularly, this invention relates to nozzles for handling fluids which are provided with means to keep the ambient conditions away from the attachment mechanism of the nozzle.

Various missile programs have produced many extremely difficult engineering design problems, among which is the problem of handling supercooled liquids such as liquid oxygen, liquid nitrogen, liquid helium, or other liquified gases. At some of these liquids are used in large tonnages as propellants in our modern missiles, nozzles must be provided to handle the fluids. The main problem is that while the particular tank is being filled, or while a missile is in the "hold" position prior to launch, the low temperature fluid within the nozzle cools it down and the ambient moisture condenses on the nozzle forming ice which jams the nozzle so that it is difficult, if not impossible, to disconnect the nozzle from the side, the top, or the bottom of the missile. The prior art uses couplings which involve the use of sledge hammers or manually operated large wheel valves or other such removing mechanisms. The present invention alleviates the problems of the prior art in that it provides means to prevent the ambient air and moisture from contacting the operating surfaces of the nozzle and thereby alleviating the jamming from freezing problems. Also, the present invention has the advantage that it may be disconnected from a remote position, thereby eliminating the danger of requiring personnel to remain close to the missile immediately prior to launching. The subject invention is also an advance over the prior art in that it provides means for the operator to be able to determine from his remote position exactly what the operating status of the nozzle is at any particular time. Further, the nozzle system is provided with safety override controls which prevent the nozzle from being open or disconnected when it is not safe to do so.

Therefore, it is an object of this invention to provide a nozzle for handling fluids.

Further, it is an object of this invention to provide a fluid handling nozzle which has enclosing means to prevent the ambient conditions from contacting the operating mechanism of the nozzle.

Another object of this invention is to provide a fluid handling nozzle for handling extremely low temperature fluids which has means to prevent the surrounding air from contacting the attaching mechanism of the nozzle.

It is a further object of this invention to provide a fluid handling nozzle which is operable from a remote position and has safety interlocks which will prevent the nozzle from being disconnected or opened when it is unsafe.

Other and further objects will become apparent in the detailed description below wherein:

Fig. 8 shows a partially cutaway side view of a second modification of the subject invention which may be connected and disconnected from a remote position;

Fig. 9 shows a partial cross-sectional view of the attachment portion of the nozzle shown in Fig. 8; and, Fig. 10 shows a cross-sectional view of the attachment portion shown in Fig. 9.

Broadly speaking, the present invention provides a fluid handling nozzle which is particularly useful for handling fluids which are at such a low temperature that when the nozzle cools to that temperature, the moisture in the ambient air freezes on the nozzle. The nozzle of this invention is provided with a passage through it and a means to control the flow of fluid through a valve, as is conventional. The invention is directed to an attaching means for attaching the nozzle to the valve which is in the tank to be filled, and this attachment means includes means for securing the nozzle to the valve and means to actuate the holding means. Further, the invention is directed to means which enclose the attaching means in order to prevent ambient moisture from contacting the surfaces of the attaching means and actuating means which move relative to each other in order that the nozzle may be disconnected even though large amounts of ice may build up on the surfaces of the nozzle which do not move relative to each other.

Figure 1:
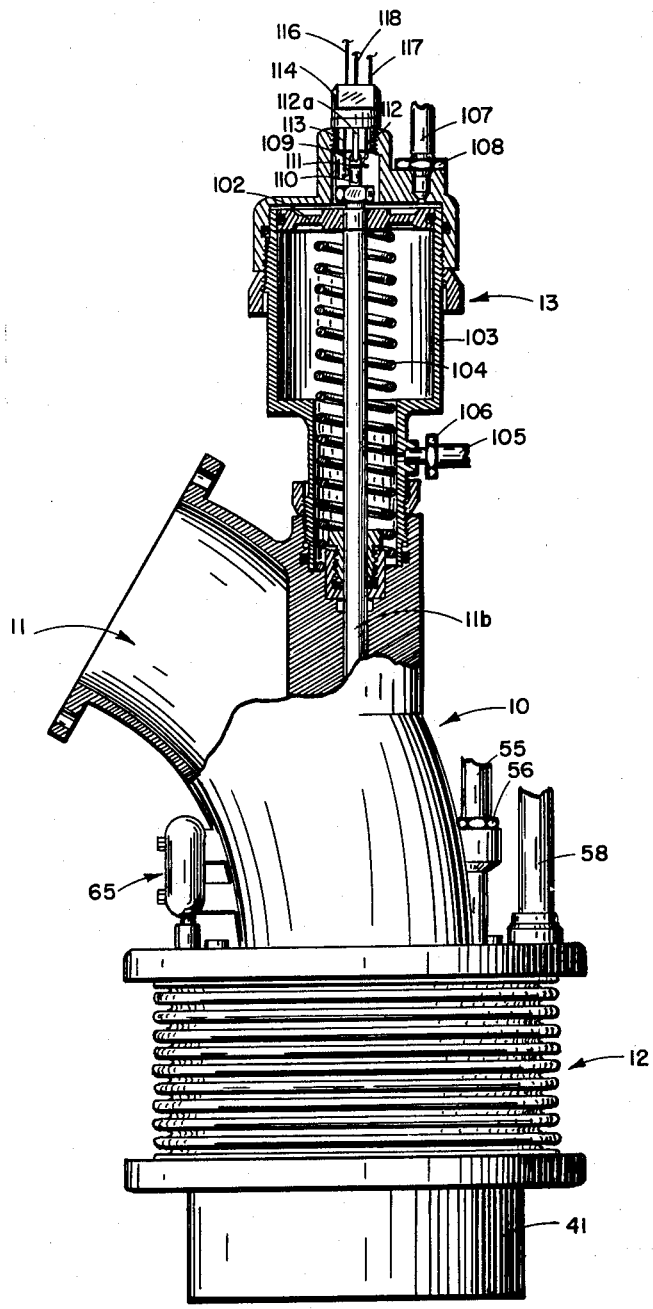
Fig. 1 shows a partially cutaway side view of a first modification of the nozzle which is remotely disconnectable.

As shown in Fig. 1, the nozzle has a body which is indicated generally by arrow 10, with a flow passage indicated generally by arrow 11 therethrough. The attachment mechanism portion of the nozzle is located at a forward portion from the nozzle and is indicated generally by the arrow 12. The nozzle valve actuating mechanism, indicated generally by the arrow 13, is provided at a rearward portion on the nozzle.

Figure 2:
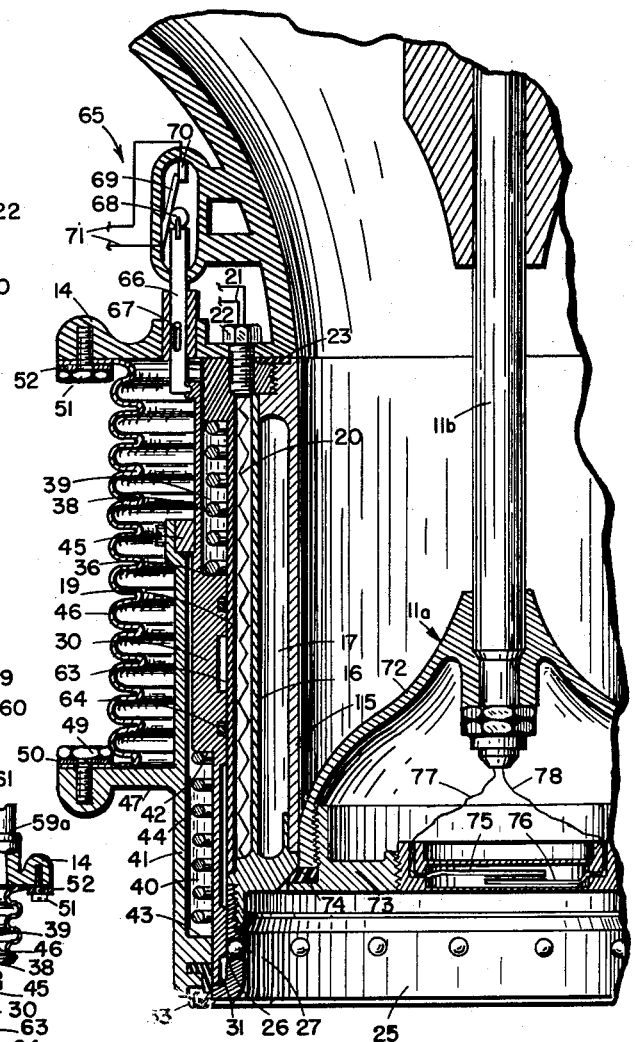
Fig. 2 shows a cross-sectional view of the attachment portion of the nozzle shown in Fig. 1.

Fig. 2 shows a detailed view of the attachment mechanism 12 on the nozzle with the nozzle valve member 11a mounted on slidably mounted shaft 11b in the flow passage 11 as shown. The rearward portion of the body 10 will be preferably cast of a material such as aluminum or machined from stainless steel and provided with a mounting flange 14 extending radially as shown. Extending forwardly of the mounting flange 14 is an insulation sleeve comprised of the inner-cylindrical wall 15 and the outer-cylindrical wall 16 with the vacuum space 17 therebetween providing insulation. The walls 15 and 16 are brazed together in a vacuum furnace in which the required vacuum is easily formed. Encircling the insulation sleeve is heater sleeve 19 which has a resistance type heater 20 mounted therein as shown schematically. The heater 20 has lead wires 21 leading from it to a power source not shown. The heater and the insulation sleeve are attached to the rearward portion of the body by a series of bolts 22 with gasket 23 located, as shown, to prevent the leakage of any of the fluid from the flow passage in the nozzle.

The heater and heater sleeve are shown in each of the modifications of the invention disclosed; however, it has been found that only in extremely severe conditions are they necessary. This is because the enclosing means described below prevents ice from forming on the surfaces of the attaching mechanism which slide relative to each other.

In order to secure the nozzle to the valve through which fluid is to be passed, holding means are provided. As shown, holding detent retainer ring 25 is mounted at the forward end of the insulation sleeve and is provided with a series of detent holes 26 with holding detents 27 which are movably mounted between the release and the holding position. The diameter of the detent holes 26, at the inside face of ring 25, is less than the diameter of the detents 27 so that the detents will not fall out when the nozzle is not connected. The retaining ring 25 is threaded into the forward portion of the insulation sleeve, and sealing means in the form of a resilient annular gasket 28 is located as shown in the joint between the nozzle and the valve in order to prevent the low temperature liquids from coming in contact with the movable detents. The seal can be made of a material such as Teflon or KEL-F, or other suitable material which will remain resilient at cold temperatures.

Actuating means must be provided in order to move the movable detents into holding position. Therefore, locking slider 30 is slidably mounted around the heater sleeve 19 and is provided with a forwardly and inwardly facing camming surface 31, juxtarelated to the holding detents 27, as shown. The locking slider 30 is relieved on its inward side at the rearward end and thereby provides rearwardly facing operating surface 36, at the forward end of locking chamber 39, for receiving operating gas pressure, preferably dry nitrogen gas. Spring 38 forms a means which normally urges the locking slider forward relative to the heater sleeve. The locking slider 30 is relieved on its outside at its forward end providing the removing chamber 40 between the locking slider and a removing slider 41. With the locking slider thusly relieved, a forwardly facing operating surface 42 is provided and removing slider 41 is provided with a rearwardly facing operating surface 43 as shown. In order to keep the removing slider 41 forwardly when the nozzle is not being used, a means such as the spring 44 is provided to normally urge the removing slider forwardly relative to the locking slider 30. In order to prevent the removing slider 41 from moving too far forwardly of the locking slider 30, an assembly ring 45 is provided attached to the removing slider 41 and this asembly ring engages a small peripheral ledge on the locking slider 30 as shown. It is to be noted that no seal is provided between the heater sleeve and the locking slider at the rearward end of the locking slider and no seal is provided between the assembly ring 45 and the locking slider. This is because during normal operation it is contemplated that the operating gas which forces the locking slider forwardly or rearwardly as required will be allowed to slowly escape out into the enclosed area formed by the bellows 46, as will be described in more detail below. Allowing the gas to escape slowly has two advantages. Firstly, the tolerances for making the parts are less critical and they may be made more economically, and secondly, if there is any moisture in the operating gas, the gas will not be in the operating chambers long enough to condense it out.

An enclosing means is provided around the attachment mechanism in order to prevent the ambient air and moisture from condensing on the moving surfaces of the members due to the low temperature involved, as this would make the attachment mechanism inoperable because of the ice formed thereon. In this case, a thin flexible bellows 46 is provided circumferentially extending between the mounting flange 14 and radially extending flange 47 on the removing slider 41. The bellows is mounted to the flange 47 by a series of bolts 49 which force the sealing ring 50 against the bellows which in turn is forced against the flange 47. The bellows is similarly sealed against the flange 14 by a series of bolts 51 in conjunction with the sealing ring 52 as shown. While metal bellows are shown and preferred in both modifications shown, other means such as a flexible material, for example plastic, could be used, or a series of closely-fit slidably related sleeves could be used. In order to completely seal the actuating mechanism from the ambient moisture, the resilient seal 53 is provided at the lower end of the removing slider and it is adapted to seal to the retaining ring of the valve as described below.

Figure 3:
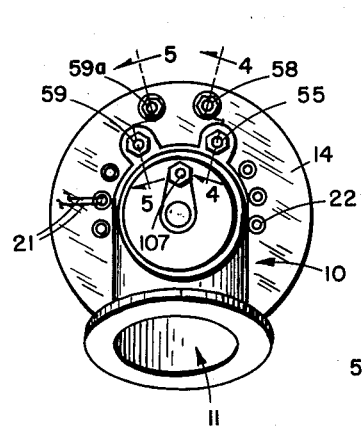
Fig. 3 shows a top view of the first modification of the nozzle looking in a forwardly direction.
Figures 4, 5:
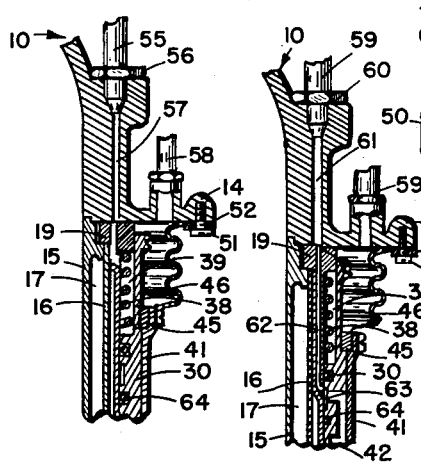
Fig. 4 shows a partial cross-sectional view of the nozzle across the lines 4—4 in Fig. 3.
Fig. 5 shows a partial cross-sectional view of the nozzle along lines 5—5 in Fig. 3.

Referring to Figs. 3, 4, and 5 it is seen how operating gas pressure is supplied to the operating chambers. Fig. 3 shows a top view of the nozzle and shows the location of the ports and pressure supply lines which actuate the nozzle. In Fig. 4 it is seen that gas pressure is supplied to the locking pressure chamber 39 through the line 55 and the port connection 56, then through the passage 57 in the body 10. With such an arrangement, it is seen that the gas pressure will operate on the rearwardly facing operating surface 36 and hold the locking slider 30 in its forwardly locking position. The line 55 is connected to a pressure source which is not shown but will be described in detail below. After the nozzle has been connected, gas pressure is also supplied to the enclosed area within the bellows 46 through the line 58. This gas pressure is less than the main gas supply so that gas may leak from the operating chambers as mentioned above; also, the pressure within the bellows holds the seal 53 in tight contact with the valve to insure an airtight seal at that point by acting on the top or rearward side of flange 47. Fig. 5 shows how the gas operating pressure is supplied to the removing chamber 40. Gas is supplied through line 59 and port 60 and then through passage 61 in the body 10 and passage 62 which is in the heater sleeve 19, and then passes through annular relief 63 and the locking slider 30 whereupon it enters the chamber 40 so that it can operate on the forwardly facing operating surface 42.

Referring back to Fig. 2, a locked position switch assembly, indicated generally by the arrow 65, is provided in order to give a remote indication of when the locking slider, and consequently the holding detents 27, are in holding position. This switch is actuated by shaft 66 which is slidably mounted in the flange 14 for limited movement which is limited by pin 67. The forward end of the shaft is engaged by the locking slider 30, as shown, and thereby the movement of the locking slider in the rearward or upward direction will cause cam roller 68 to move switch reed 69 and thereby break the contact between the switch reed 69 and contact 70. The switch reed and the contact are connected to remote lead wires 71, as shown, which in turn give a signal to the safety interlock system which will be described in conjunction with Fig. 7.

The nozzle valve member 11a is attached to the slidable shaft 11b in some suitable manner as shown. The valve member is composed generally of the streamlined member 72 and the base member 73 which can be threaded together as shown. A resilient seal 74, which may be made of Teflon or similar material, is provided to obtain a good seal with the nozzle valve seat at the bottom of the insulation sleeve. A magnet responsive switch is provided in the center of the base 73 in order to provide a remote indication of whether the valve poppet is closed as described below. The magnetic switch is composed of two magnetic attractable spring leaves 75 and 76, respectively, which are connected to the remote indicating wires 77 and 78 which pass rearwardly through the center of shaft 11b. As disclosed in Fig. 6, a magnet is provided in the valve plate of the valve through which fluid is to be passed, and thereby when the nozzle valve member is abutting the valve plate the magnet closes contacts 75 and 76 which closes the circuit to a remote point indicating to the operator the condition of the nozzle valve member and the valve plate.

Figure 6:
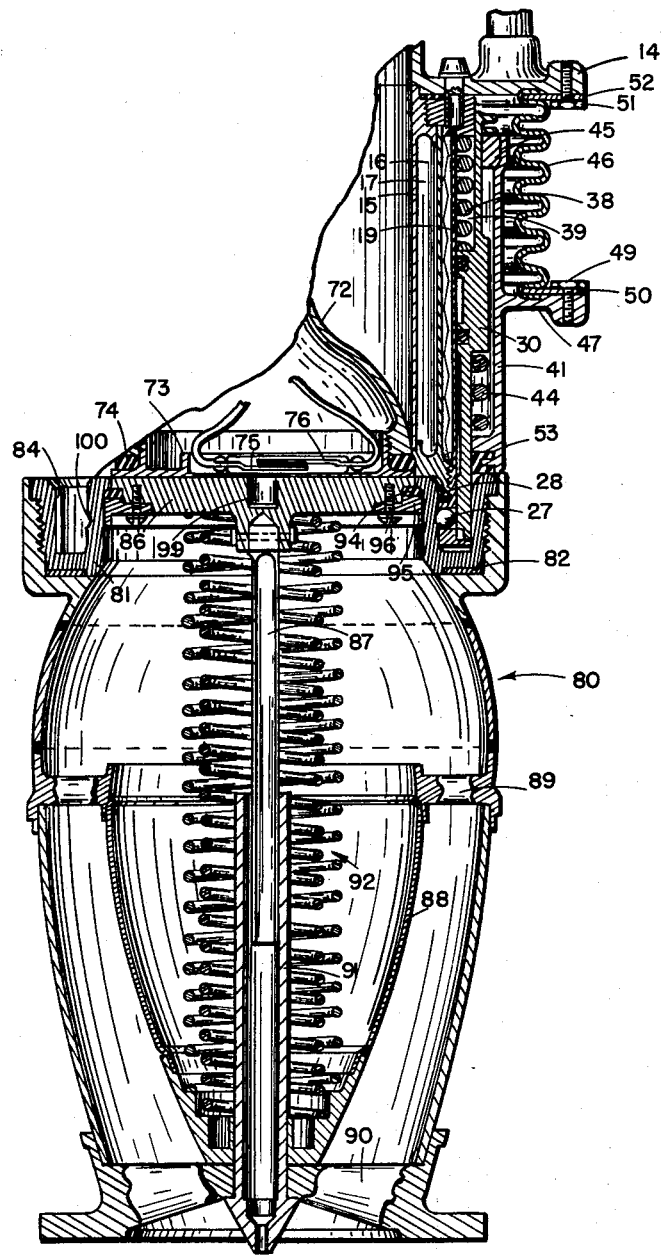
Fig. 6 shows a partial cross-sectional view of the attachment portion of the nozzle shown in Fig. 1 as it would be oriented when attached to a valve.

Fig. 6 shows the nozzle as attached to a poppet valve. The poppet valve consists generally of the valve housing indicated generally by the arrow 80, which is made of pressed stainless steel and then brazed together. The valve housing has been relieved at its outward portion and the detent receiving ring 81 is provided and is threaded against the gasket 82. The ring 81 is slotted at various portions 84 in order to insert a tool to screw the ring into the housing and thereby force the detent receiving ring 81 into sealing relation. The valve has a valve plate 86 at its outward end which is provided with the shaft 87 which is of some irregular shape such as triangular in cross-section in order to slide more easily and reduce the area which might freeze. In order to support the valve plate during operation, a streamlined support body 88 is provided which in turn is supported by spoke-like supports 89 and 90. Within the support body 88 is located the sleeve 91 around which is located the spring assembly 92 which normally urges the valve plate into closed relation. In order to provide a good seal, an annular sealing member 94 is provided and may be made of material such as Teflon. This sealing member is held in place by the retaining ring 95 which in turn is held in place by a series of bolts 96. The valve plate 86 is provided with a magnet 99 which attracts the leaves 75 and 76, closing them as shown, when the valve plate abuts base plate 73 of the nozzle valve member.

In order to attach the subject nozzle to the valve, the operator first pulls the removing slider 41 rearwardly relative to the body by grasping the mounting flange 14 and the radially extending flange 47. The assembly ring 45 on the removing slider 41 engages the rear peripheral ledge on the locking slider moving it rearwardly allowing the movable detents 27 to move to the release position. Then the nozzle is moved into the proper relationship with the valve and the removing slider is released. The action of spring 38 forces the locking slider 30 forwardly, and the camming surface 31 forces the movable detents 27 into holding relation with the annular recess 100 in the detent receiving ring 81. The resiliency of the spring 44 causes the removing slider 41 and the seal 53 to abut firmly against the receiving ring 81 and prevents the ambient moisture and air from getting into the area of the movable detents. It should be noted that spring 38 is stronger than spring 44 so that the locking slider 30 can return to its forward locking position though the removing slider 41 does not return all of the way before engaging the detent receiving ring 81. After the nozzle has been thus attached, a dry operating gas is applied to the locking chamber 39 from a remote position to insure that the detents remain in their holding position as described in detail in conjunction with Fig. 7 which shows a schematic of the overall system. When the nozzle has been properly attached and locked in place, the nozzle valve 11a is then moved forward by the nozzle valve actuating mechanism 13 shown in detail in Fig. 1.

As seen in Fig. 1, at the rearward end of the nozzle piston 102 is mounted on the shaft 11b within operating cylinder 103. The mechanism has a return spring 104 provided in order that the nozzle valve be normally urged closed when there is no pressure on the system. However, when there is high fluid pressure within the nozzle it is necessary that operating pressure within the nozzle be supplied to the forward side of the piston 102 and therefore line 105 applies this operating pressure through the port connection 106 as shown. The line 105 is connected to a pressure source which is not shown but will be described in detail below. In order to open the nozzle valve, operating pressure is applied through the line 107 and the port connection 108 to force the piston 102 forward. The source of the operating pressure for line 105 and 107 is not shown but will be described and shown in conjunction with Fig. 7.

As mentioned above, leaves 75 and 76 in the nozzle valve member are closed by the force of magnet 99 in the valve plate 86 (Fig. 6) when the nozzle is attached to the valve in order to give a remote indication of when the valve plate is abutting the nozzle valve. In order to do this, an electrical jack is provided at the rearward end of the shaft 11b and has the two electrical contact members 109 and 110 respectively separated by the insulation member 111 as shown. The wires 77 and 78 pass up through shaft 11b and are connected to the contact members 109 and 110. These contact members are in turn contacted by the leaf contacts 112, 112a, and 113, respectively, which are mounted in the plug 114 which is threaded into the nozzle structure and has the lead wires 116, 117, and 118 leading therefrom.

Figure 7:
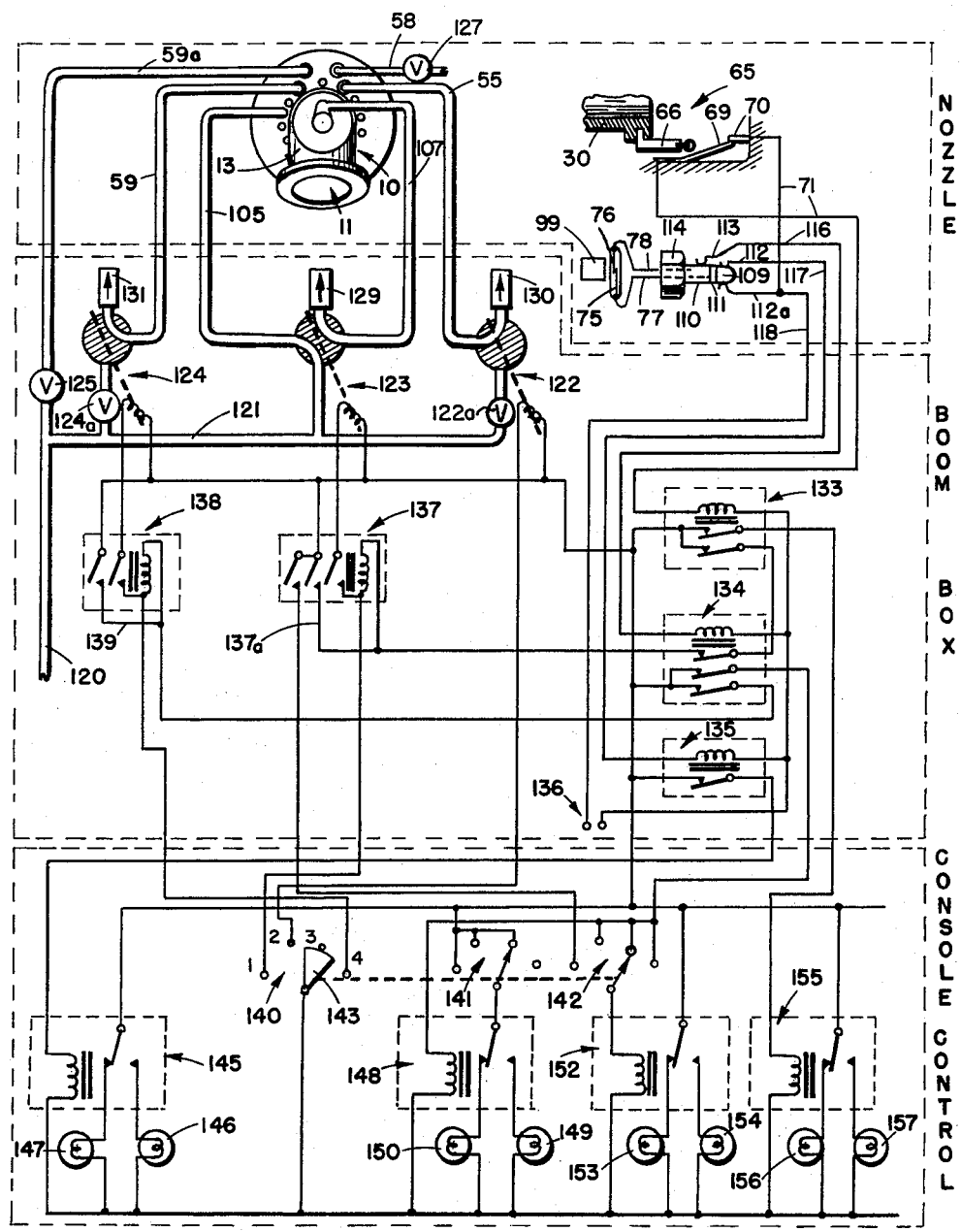
Fig. 7 shows a schematic view of a typical system which is used in conjunction with the nozzle shown in Fig. 1 in order that the nozzle may be safely operated from a remote point.

Fig. 7 shows the electrical and pneumatic system which is used in conjunction with the first modification of the subject invention in schematic form. As shown, the figure is divided generally into three portions by the dashed lined boxes labeled "nozzle," "boom box" and "console control." The structure shown within the boxes are to be located either in the nozzle or in the control box which is mounted on the boom from which the nozzle is swung or the console control which is a safe distance away from the launch site and from which the operator controls the subject nozzle.

As indicated above, it is preferred that dry nitrogen gas be used in order to operate the nozzle and thereby eliminate the possibility of freezing, and therefore the line 120 is connected to a dry nitrogen gas supply which is not shown. The pressure of the gas is not critical, but it has been found that operating pressures of 500 p.s.i. work very well with liquid oxygen delivered at 50 p.s.i. The gas is supplied through header 121 to the solenoid operated lock valve 122, to the solenoid operated poppet open-and-close valve 123, and to the solenoid operated disconnect valve 124. Pressure regulator 122a is provided to reduce the pressure supplied to the lock valve 122 to around 25 p.s.i. Since the pressure to the bellows is desired to be relatively low, a demand type regulator valve 125 is provided in line 59a to the bellows. With the pneumatic system shown in the connect cycle, the operator manually pulls the removing slider rearwardly, expelling the gas within the bellows through the pressure relief check valve 127 which is set to relieve pressure in excess of 8 to 20 p.s.i. After the nozzle is connected, the removing slider is released and the demand type regulator valve supplies new dry gas to the bellows chamber. The operating mechanism of the lock valve 122 is then rotated 90 degrees to the lock position and gas pressure is supplied through line 55 to keep the locking slider forwardly relative to the heater sleeve. In order to open the nozzle poppet, the poppet open-and-close valve 123 is operated turning the operating mechanism 90 degrees so that the line 107 which is connected to the space above piston 102 is no longer vented to atmosphere through the vent 129 and instead the line 105 which is connected forwardly of the piston 102 will be vented to the atmosphere. When it is desired to close the nozzle poppet, the solenoid of the valve 123 is de-energized and the valve returns to the position shown schematically wherein line 107 is vented to atmosphere and line 105 is connected to the operating pressure and this pressure forces the piston 102 rearwardly. When it is desired to remove the nozzle from the valve being filled, the lock valve 122 is de-energized and it will return to the position shown so that the gas pressure preventing rearward movement of the locking slider is vented to atmosphere through vent 130. Also, the disconnect valve 124 is operated and the operating mechanism of this valve is turned 90 degrees so that the supply gas pressure is supplied to removing pressure chamber 40 to force the locking slider rearwardly relative to the removing slider and thereby releasing the detents 27, and then the body is moved rearwardly also, moving the nozzle away from the valve.

In order that the nozzle can only be disconnected from the valve being filled when it is safe, several interlocking relays are provided in the boom box and they are connected to the controls in the console control in such a fashion that the nozzle may be safely operated from a remote position. As shown schematically, mounted within the boom box is a locking switch interlock relay indicated generally by arrow 133, the magnetic switch interlock relay indicated generally by the arrow 134, and the nozzle poppet interlock relay indicated generally by the arrow 135. These interlock relays are connected to the locking switch assembly 65 and the jack assembly on the nozzle poppet shaft as shown. The arrow 136 generally indicates a 24-volt direct current power supply which is not shown and which supplies the power for the interlock mechanism. The three interlock relays are shown as being closed from their normally open position since the circuits through their respective solenoid coils are completed. However, it can be seen that if the locking slider 30 were moved so that the contacts between the switch reed 69 and the contact 70 were broken, the solenoid coil in the interlock relay 133 would become de-energized and the switch reeds in the relay would return to their normally open position. Similarly, if the circuit between the leaf contacts 112, 112a, and 113 is broken by either the shaft of the poppet being moved forwardly in the nozzle or the magnet 99 moving away from the leafs 75 and 76, the magnetic switch interlock relay 134 will become de-energized and the switch reeds in the interlock relay will return to their normal open position. Likewise, the operating solenoid in the nozzle poppet interlock relay 135 is energized only when there is a conducting circuit between the leaf contact 112 and the leaf contact 112a and therefore the switch reeds in the relay 135 will be closed only when the nozzle poppet is in the rearward or closed position.

Also provided in the boom box is the nozzle poppet open-and-close relay indicated generally by the arrow 137 and the disconnect relay indicated generally by the arrow 138. These two relays are connected to the poppet open-and-close valve 123 and the disconnect valve 124 respectively, and control the operation of these valves as can be seen in the schematic diagram. However, as will be disclosed below, these relays 137 and 138 can only be operated when it is safe to do so.

As indicated above, it is normally desired that the present liquid oxygen fueling nozzle be operable and disconnectable from a position a safe distance away. Therefore, the apparatus indicated schematically within the dashed labeled "console control" indicates the apparatus which is located at such a remote position. The operator has the master control step switch, indicated generally by the arrow 140, and which has the step switches indicated by the arrow 141 and 142 ganged with it so that the operator only turns the master control step switch 140 and the other switches move with it. These switches are of the conventional type and are connected to the circuitry shown in order that: the nozzle may be manually connected when the switches are turned to the "neutral" position No. 3; the holding detents will be locked in holding position when the switches are turned to the "nozzle locked" position No. 2; the nozzle poppet will open, if it is safe, when the switches are turned to the "open poppet" position No. 1, and the nozzle will disconnect itself from the valve when the switches are turned to the "disconnect" position No. 4. It should be noted that sliding contact 143 of switch 140 is wide enough to close two contacts at once. As will be explained below, it is impossible for the nozzle to be disconnected when it is unsafe for such reason as the valve plate of the valve is not closed or the nozzle poppet is not closed, and also it is impossible to open the nozzle poppet if the nozzle is not locked in position; however, as an additional safety feature, a series of lights are provided on the console control panel in order to tell the operator exactly what is happening within the nozzle and thereby inform him of what, if anything, is wrong with its operation. As shown, a solenoid operated two-position relay, indicated generally by the arrow 145, is provided and will be energized by the 110-volt alternating current power source whenever the nozzle poppet interlock relay 135 switch is closed. With this electrical hookup, it is seen that if the nozzle poppet is forward, the circuit is broken between the leaf contacts 112 and 112a respectively, which de-energizes the solenoid in the nozzle poppet interlock relay 135 and thereby the switch within relay 135 opens which de-energizes the solenoid within two-position switch 145 and the reed contact within the switch relay moves to its normal position by spring tension and closes the circuit to the poppet open light 146. Conversely, it can be seen that whenever the nozzle poppet is closed, since the circuit to the solenoid in the interlock relay 135 is closed, it is energized and thereby the circuit to the solenoid within the two-position switch 145 is closed and the reed contact within this switch is moved towards the solenoid and closes the circuit to light up the poppet closed light 147. In order to indicate the valve is open or closed, a solenoid operated two-position switch, indicated generally by the arrow 148, is provided and is so installed that when the solenoid is not energized, the reed contact closes the circuit to the valve open light 149, and conversely when the solenoid is energized, the circuit is closed to the valve closed light 150. In order to tell the operator whether the nozzle is connected or disconnected, a similar solenoid operated two-position switch, indicated generally by the arrow 152, is provided and is so connected that its normal de-energized position will close the circuit to the nozzle disconnect light 154, whereas its energized position will close the circuit to the nozzle connect light 153. As a final safety factor, a solenoid operated two-position switch indicated generally by the arrow 155, is provided and is shown closing the circuit to the nozzle lock light 156 since the solenoid is energized. If the circuit to the solenoid of the switch 155 is broken, the switch reed of this switch will return to its normal position which closes the circuit to the nozzle unlocked light 157. With the structure provided, it is impossible for the nozzle to be disconnected or operated at an improper time as described below.

In the normal operating procedure, the ganged step switches are turned to the "neutral" position No. 3 and the nozzle is manually attached to the valve in the manner described above. If the nozzle has been properly attached to the valve, the locking slider will have returned to its forward position and the locking switch will be closed as shown, as well as the circuits through the poppet shaft which includes the leaf contacts 112, 112a, and 113 and 75 and 76. Because the above-mentioned circuits are closed, the interlock relay 133, 134, and 135 will be closed as shown, completing the circuit to the solenoid operated two-position switches indicated generally by the arrows 145, 148, 152, and 155 which respectively indicate by lights that the poppet is closed, that the valve is closed, that the nozzle is connected, and that the nozzle is locked. At this time, the gang switches 140, 141, and 142 are rotated to the left to the "lock" position No. 2.

This will complete the circuit to the solenoid operated lock valve 122 which will then rotate its operating mechanism 90 degrees so that dry nitrogen gas pressure is supplied through the line 55 to the chamber 39 to insure that the locking slider 30 will remain in the forward locking position. It is seen that if there were some foreign substance which prevented the locking slider from going to its forwardly locking position, the contacts of the locking switch 65 would not have closed, and therefore the interlock relay 133 would not close and the switch reed of switch 155 would close the circuit and light the nozzle unlock light 157, telling the operator at his remote position that the nozzle is not locked to the valve. Further, if for some reason, the nozzle popped off of the valve and the locking slider moved to its forwardly position, the operator could tell this condition from his remote position also since the magnet would not be near enough to close the contacts 75 and 76 which would break the circuit to the solenoid in the interlock relay 134 which would in turn break the circuit to the solenoid operated switch 152, whereby the reed switch 152 would move to its de-energized position connecting the circuit and lighting the nozzle disconnect light 154. It should be noted that if either the locking switch 65 or the poppet magnet responsive switch with its contacts 75 and 76 are open, either the locking switch interlocking relay 133 or the magnetic switch interlock relay 135 will be de-energized which will prevent the nozzle poppet open and close relay 137 from being operated even if the gang switches 140, 141, and 142 were turned to the "open poppet" position No. 1 inadvertently by the operator.

After the operator has checked the lights at his console control to be sure that the nozzle is properly attached, he rotates the gang switches further to the left to the open poppet position No. 1. As mentioned above, the sliding contact 143 on the master switch 140 has an arcuate length which is long enough that when the switch is turned to the open poppet position the contact for the lock position is also closed. At this time, if the interlock relays 133 and 134 are closed, the nozzle poppet open-and-close relay 137 will also close and operate the solenoid operated poppet open-and-close valve 123 whereby dry nitrogen gas is supplied through line 107 to the chamber above the piston 102, and the space below the piston 102 is vented to atmosphere through line 105 and vent port 129. It is seen that when the poppet is moved forwardly, the circuit is broken between the contacts 112 and 112a whereby the interlock relay 135 is de-energized thusly breaking the circuit to the switch 145 and the reed of this switch returns to its de-energized position and the poppet open light 146 will light up, indicating that the poppet is open. It should also be noted that when the poppet is moved forwardly, the interlock relay 134 is de-energized since the circuit is broken between contacts 112a and 113; however, the solenoid and relay 137 will remain energized since once the relay is closed, 110 v. alternating current is supplied through the latching circuit 137a. After the desired tank is filled, the gang switches 140, 141, and 142 are rotated clockwise to the "lock" position No. 2 where the respective wipers only contact the electrical contact No. 2 causing the nozzle poppet to move rearwardly to its closed position.

When the nozzle poppet returns to its closed position, the poppet closed, the valve closed, the nozzle connect, and the nozzle lock lights 147, 150, 153, and 156 respectively will be lighted as described above, and the operator will be able to tell from his remote position that it is safe to disconnect the nozzle from the valve. If the valve plate 86 freezes in its open position and fails to return to the closed position when the nozzle poppet is moved rearwardly, the magnet 89 will not be close enough to close the magnetic switch contacts 75 and 76 since there still will not be any close circuit between the contacts 112a and 113 and the interlock relay 134 will remain de-energized rather than becoming energized as shown in the figures. Thereby, the nozzle cannot be disconnected even if the ganged switches are rotated inadvertently to the "disconnect" position No. 4, since, as pointed out in connection with Fig. 2, the spring 38 is strong enough to hold the locking slider 30 in its forward locking position though there is no pressure in locking chamber 39. Since the solenoid in the switch 148 remains de-energized, the valve open light 149 will remain lighted, indicating to the operator that the valve plate has failed to return to the closed position. If the valve switch should get stuck, the operator will merely open the nozzle poppet again and the shock of the poppet hitting the valve plate will free the frozen shaft 87. The gang switches 140, 141, and 142 are then returned to the "lock" position No. 2 and the operator checks to see if the valve close light 150 has been lighted.

In order to disconnect the nozzle from the valve, the operator rotates the gang switches 140, 141, and 142 clockwise to the "disconnect" position No. 4. At this time, the gas pressure in locking chamber 39 will have been vented to atmosphere through vent 130, and if the interlock relay 134 is closed the disconnect relay 138 will be energized, causing the solenoid operated disconnect valve 124 to be rotated so that the nitrogen gas pressure is supplied through line 59 to the removing pressure chamber 40. This will cause the locking slider 30 to move rearwardly relative to the removing slider 41, allowing the holding detents 27 to be released, and impact against the flange 14 which causes the entire nozzle mechanism to be "kicked away" from the valve. Similar to the relay 137, relay 138 has a latching circuit 139 so that the relay 138 will remain energized even after the nozzle is kicked away from the valve, thus insuring proper removal even though a large amount of ice has built up around the outside of the nozzle.

It has been found in many applications that it is desirable to not only disconnect the nozzle from the valve from a remote position, but also to connect the nozzle to the valve on a tank to be filled from a remote position. The modification of the nozzle shown in Fig. 8 is not only remotely disconnectable, but is remotely connectable. This modification of the nozzle has a frame 160 by which the nozzle may be suspended from a boom which is used to move the nozzle to a position close to the valve through which fluid is to be passed. Alternatively, the frame 160 might be mounted in some stationary fixture such as the launch pad for a missile, and then the tank for the missile to be filled is placed next to it, and by the remotely operable means described below the nozzle is moved forward and connected to the valve mechanism. In this latter case it is preferable that the nozzle be resiliently mounted in the fixture so that the nozzle can compensate for any misalignment of the valve to be filled. In this particular modification, the fluid to be handled is supplied to the nozzle through the pipe 161 which is connected to a fluid source not shown and is mounted to one of the transverse frame members 163, as shown. The frame 160 is shown as cylindrical but naturally it can take other shapes as needed. A frame sleeve 162 is provided within the frame 160, as shown, and has inner and outer walls with an evacuated space therebetween in order to minimize the heat absorbed by the nozzle in that region and minimize the amount of ice formed on the outside of the frame sleeve. Mounted within the frame sleeve 162 is the body of the nozzle indicated generally by the arrow 164. For ease of manufacture, the body is made as a body sleeve having inner and outer walls 165 and 166 respectively, with an evacuated space therebetween in order to minimize the formation of ice on the outside of the body 164. Slidably mounted within the body is the nozzle poppet valve sleeve 167 which may be remotely actuated in the manner described below. This modification of the nozzle as the previously discussed modification has an attaching mechanism, or means indicated generally by the arrow 168, which is enclosed by enclosing means in order that the ambient air and moisture be kept away from the operating mechanisms. The nozzle is shown in its position a short distance away from the valve 169 which is located in the wall 170 of the particular tank which is to be filled.

In order to move the nozzle to and from the valve, the frame sleeve 162 is provided with rear and front inwardly extending shoulders 172 and 173 respectively, fixedly mounted to and extending circumferentially around the inside of the frame sleeve. A piston portion 174 is rigidly mounted to, and extends circumferentially around the body sleeve 164, and operating pressure chambers are formed between the piston portion and each of the shoulders. With this structure, operating gas such as dry nitrogen may be supplied through line 175 and thereby force the nozzle body and attaching mechanism forwardly relative to the frame, or dry nitrogen gas pressure can be supplied through the line 176 and thereby force the nozzle rearwardly relative to the frame. The gas pressure is supplied to these chambers through the above-mentioned lines from a remote position as described below.

In order to move the poppet valve sleeve 167 forwardly relative to the body sleeve and thereby open the nozzle, the body sleeve is provided with a rear inwardly extending shoulder 177 and a front inwardly extending shoulder 178 with the piston portion 179 fixedly mounted to the poppet sleeve slidably mounted between these shoulders. As shoulder 172 and piston portion 179 engage the poppet sleeve and the body sleeve respectively, an operating chamber is formed into which gas pressure is introduced through line 184 to a passage in body sleeve 164, and then through port 181 to move the nozzle poppet sleeve forwardly. With this modification, the particular fluid being handled is able to get into the area in front of the shoulder 178 and therefore the bellows 182 are provided extending between shoulder 178 and piston portion 179 to seal the area of the movement of the piston portion 179 since the dynamic seals that are presently available are too unreliable for use with low temperature fluid such as liquid oxygen. These bellows are preferably made of stainless steel and are very thin in order that they be flexible at the low temperatures involved, and, therefore, since the particular fluid being pumped is generally at a very high pressure, a series of hoops 183 are provided to prevent the bellows from being expanded outwardly too much. With this structure, as shown, the gas pressure may be introduced through line 185 into a pressure chamber thusly formed and will move the nozzle poppet sleeve rearwardly relative to the body sleeve 164.

As mentioned before, the seals which are presently available are unreliable at the low temperatures involved and although it does not matter whether the dry gas leaks through the seal, it is extremely undesirable for liquid oxygen to leak through the seal into an operating chamber. Therefore, a bellows 186 is mounted between the frame sleeve 162 and the nozzle poppet valve sleeve 167, as shown, since the liquid oxygen would leak between the nozzle poppet sleeve 167 and the line 161 and get into space 187. Bellows 186 is provided with the series of internal rings which prevent the bellows from being crushed inwardly by the pressure of the fluid being handled since these bellows are very thin in order to operate at the low temperatures involved. Port 189 is provided so that when the nozzle poppet sleeve 167 is moved rearwardly relative to the frame, the fluid within the space 187 will not be trapped.

Fig. 9 shows a detailed cross-sectional view of the attachment portion of the second modification of the present invention. As can be seen, the streamlined nozzle poppet valve member 191 is supported forward of the end of the nozzle poppet sleeve 167 by the plates 192 which are located at right angles to each other and parallel to the flow of the fluid being handled, as well as being attached to the nozzle poppet 190 and the poppet sleeve 167 by some suitable means such as brazing or welding. Similarly to the first embodiment, a base plate 193 is threaded into the poppet body 191 and holds a seal 194 against the holding detent retainer ring 195. Nozzle poppet valve body 191 is provided with a magnetic switch the same as in the first embodiment in order to remotely indicate to the operator whether the valve plate 196 with its magnet 196a are abutting the poppet body 191. The wires 197 which carry this signal to the control panel of the operator are schematically shown. In actual design, the wires 197 would be located within or be attached to the surface of the plates 191 and the poppet sleeve 167 as they travel to a position rearwardly in the nozzle where they will pass through the side of the nozzle to the remote position of the operator, as indicated schematically in Fig. 8. It should also be noted in Fig. 8 that poppet closed switch 197a is provided in one of the wires 197 and has a contact mounted on shoulder 177 and piston portion 179 respectively, which touch each other when the poppet sleeve 167 is in the rearward closed position.

Similarly to the first modification, a mounting flange 198 is mounted to the body sleeve 164 at the rearward end of the attaching means 168. Since the body sleeve is evacuated, it performs the function of the insulation sleeve in the first modification. As with the first modification, space is provided for a heater between the cold material fluid handled and the attaching mechanism by heater sleeve 199; however, it is in the only very severe conditions that a heater will ever be needed. Locking slider 200 furnishes a means to actuate the holding detents. As shown, the locking slider 200 is slidably mounted around the heater sleeve 199 and is relieved on its inward side to form locking chamber 201 into which pressure is introduced to hold the locking sleeve and thereby the detents in holding position. Spring 202, located in the locking chamber provides a means which normally urge the locking slider forwardly in the locking position. Removing slider 203 is slidably mounted around the locking slider 200, and with the locking slider forms the removing pressure chamber 204 which has spring 204b located in it which tends to urge the removing slider 203 forwardly relatively to the locking slider.

This modification of the nozzle has the advantage that it may be operated from a remote position to connect the nozzle to the valve, as mentioned above, and in order to do this the removing slider 203 is provided with a radially outward extending forwardly facing operating surface 205 and a connect actuator sleeve 206 is mounted to the mounting flange 198 and is provided with inwardly extending rearwardly facing operating surface 207. Sleeves 203 and 206 with operating surfaces 205 and 207 form connect operating chamber 210 which, when pressure is introduced therein, will cause the moving slider 203 to move rearwardly relative to the body sleeve 164 and the strength of spring 204b will move the locking slider 200 rearwardly also. This will release the holding detents so that the nozzle may be attached as will be described in detail below.

As shown, a locking switch assembly 208 is mounted on the inside of the connect sleeve 206 in such a manner that when the locking sleeve 200 is in its forwardly locking position, the contacts will be closed and a signal will be indicated to a remote position through the wires 209 shown schematically.

As mentioned above, one of the key features of the subject invention is that it provides that the ambient air and moisture is kept away from the surfaces of the parts of the nozzle which move relative to each other as they tend to become very cold when handling cold fluids such as liquid oxygen. If these surfaces were not so protected, the resulting formation of ice would prevent the operation of the nozzle. Here, as in the first modification, a bellows 211 is provided which preferably may be made of a thin stainless steel; however, other materials could be used. The bellows 211 is attached at its rearward end to the mounting flange 198 by means of the ring nut 212. In order to mount the bellows to the nozzle at the forward end, an outwardly extending flange 213 is provided and is held to the removing slider 203 by means of the ring nut 214, as shown. The forward end of the bellows 211 is secured in sealing relation to the flange 213 by means of the washer 215 in conjunction with suitable bolts. As with the first modification, the subject invention has the advantage that the different sleeves and sliders of the attaching mechanism may be made with very loose tolerances since it is not critical, but rather is actually preferable that the operating gas be able to leak while the nozzle is being used. If such leakage is allowed, it is seen that the gas would leak into the area in which the locking switch assembly 208 is located and then pass through the port 217 in the connecting sleeve 206 which is shown in Fig. 10 into the closed area within the bellows 211. Since bellows 211 are to be pressurized or vented to atmosphere at various stages of the use of the nozzle and therefore the line 218, shown schematically, is connected into the enclosed area and will be described in more detail below.

The valve with which the nozzle is used is substantially the same as the valve used with the first modification of the nozzle, and the valve plate 196 is supported on the shaft 220 and the springs indicated generally by the arrow 221 in a streamlined support pod substantially the same as support pod 88 and the seal 222 with retaining ring 223 are substantially equivalent to the seal and retaining ring 94 and 95 respectively shown in Fig. 2; however, the detent receiving ring 224 is different. Here the walls converge as they extend in the forwardly direction instead of being parallel to each other in order that the nozzle will attach itself to the valve more easily. With this structure, the inner surface of the receiving ring 224 has a conical portion 225 and 227 extending forwardly and outwardly at about an angle of 30° from the axis of the valve and detent groove 226 is located between these portions for receiving the holding detents 209 as shown. The outer wall 228 of the receiving ring 224 diverges as it extends in the rearwardly or outwardly direction and terminates in the rearwardly facing sealing surface 229 which extends at right angles to the axis of the valve and the nozzle.

The holding detent retaining ring 195 has been changed in the second modification of the nozzle in order to work with the detent retaining ring 224 described above. Therefore, the retaining ring 195 has the forwardly and outwardly extending conical surface 230 extending from the forward end of the body sleeve 164 and it has an annular seal 231 which is made of Teflon or some other substance which will work satisfactorily at the low temperatures involved mounted therein. Extending forwardly from the conical surface 230, is a generally cylindrical portion which has a series of detent holes 232 in which the movable locking detents 209 are located. As in the first modification, the diameter of the detent holes 232 is larger than the diameter of the detents 209 except at the inside surface of the retainer ring 195 where the diameter is smaller in order to prevent the detents from falling out of the holes. With this construction, the locking slider 200 provides a means for moving the detents from the release position to the holding position external of the ring 195 in order to engage the groove 226 and secure the nozzle to the valve.

As can be seen, the second modification of the retainer ring and holding ring have several advantages which, by far, outweigh the disadvantages. Firstly, due to its construction, the tolerances in the manufacture of the nozzle are very much less critical. Secondly, this modification of the locking mechanism has the advantage that the nozzle may be off center from the valve at the initial stage of attachment and as the nozzle is forced towards the valve, it will automatically line itself up properly. Thirdly, the detent groove 226 has been made with a forwardly and inwardly extending camming surface whereby as the locking slider 200 forces the holding detents 209 inwardly, the nozzle is pulled forwardly into tighter sealing relation and the seals 231 and 234 prevent the fluid being handled on one hand and the ambient air and moisture on the other hand from getting into the area of locking detents. As can be seen, either modification of the nozzle can use the locking apparatus described immediately above, and conversely either modification of the nozzle could use the locking means described in conjunction with the first modification of the nozzle.

As mentioned above, the second modification, as the first modification, can be operated from a remote position and a very simple system to do this is shown in the schematic in Fig. 8. This particular system is shown in order to disclose how simple the operating system would be and yet indicate to the operator in his remote position exactly what is happening at the nozzle; however, it does not have the interlock safety mechanism of the first system shown. It is to be understood that a system with safety interlocks to prevent unsafe operation would be nearly the same as shown in Fig. 7, except that an extra step on the ganged switches would be needed in this modification for moving the body sleeve relative to the frame and actuating the connect operating chamber. Also, the solenoid operated valve for pressuring or venting the bellows would have to be connected to the proper steps of the ganged switch.

The power source 236, which may be either alternating current or direct current, is provided at the remote position from which the operator operates the nozzle. Also, located at the remote position will be poppet and nozzle locked lights 237 and 238 respectively, as well as switches 239, 240, 241, 242, and 243 respectively. These switches are connected to the nozzle advance solenoid operated valve, the poppet open-and-close solenoid operated valve, and the bellows solenoid operated valve shown schematically and referred generally by the arrows 244 through 248 respectively, which are to be located close to the actual nozzle. If the nozzle were to be mounted on a movable boom which would be able to be moved into close proximity with the valve to be filled, these solenoid operated valves would be located in a boom box similar to the first modification. Each of the valves 244 through 247 are connected to a 500 p.s.i. dry nitrogen gas pressure supply which is not shown through the lines designated as P. Further, it is seen that each of the solenoid operated valves 244 through 248 are vented through atmosphere through the lines designated by V. Bellows operated solenoid valve 248 is connected to the dry gas source; however, the pressure is a lower pressure than is supplied to the other valves and, therefore, the line through which pressure is supplied is designated as LP. It should also be noted that a pressure relief valve 245 and a desiccant container 250 are provided in conjunction with valve 248.

Referring to Fig. 8 and Fig. 9, a complete cycle will now be described in order to fully understand the operation of the nozzle. Switches 239 and 242 are closed simultaneously which will operate the nozzle advance solenoid operated valve and the connect solenoid operated valves 244 and 247 respectively. This will supply dry gas through line 210a and passageway 210b into the connect operating chamber 210 and through line 175 into the chamber rearwardly of the piston portion 174 on the body sleeve while the gas pressure in the removing chamber 204 and the chamber in front of the piston portion 174 on the body sleeves are vented to atmosphere. This will cause the removing slider 203 to be moved rearwardly relative to the connect actuator sleeve 206, and consequently the mounting flange 198, causing the gas to be partially expelled from bellows 211 through desiccant container 250. This movement also will cause the locking slider 200 to move rearwardly as in the first modification while the gas pressure on piston portion 174 is causing the nozzle to move forwardly into operating or connected relation with the valve. At this time, the nozzle poppet 191 will be close enough to the valve plate 196 that the magnet 196a will close the magnetic switch within the nozzle poppet 191 and the poppet light 237 should light up. The operator then closes switches 241 and 248 and opens switch 242 simultaneously, thereby causing dry gas pressure to be introduced into the locking chamber 201 through the line 201a, and the connect operating chamber 210 will be vented to atmosphere through line 210a, allowing spring 204b to move the removing slider forwardly, and its seal 234 will seal against sealing surface 229 and thereby prevent the ambient moisture and atmosphere from getting into the area of the holding detents 209. Also, the low pressure dry nitrogen gas is introduced into the bellows 211 through line 218. It is seen that with this design, as the locking slider is moved forwardly, thereby forcing the holding detents 209 inwardly, the nozzle is pulled into very tight relation due to the shape of the detent groove 226. It is seen also that due to the shape of the holding detent retaining ring 195 and the detent receiving ring 224, the nozzle and the valve may be slightly misaligned and the locking action will align the nozzle to the valve if the nozzle is resiliently mounted in some manner, as pointed out above. After the nozzle is locked onto the valve, the lights 237 and 238 will be lighted, indicating to the operator at his remote position that he may safely open the nozzle poppet.

In order to open the nozzle poppet 191, the operator closes switch 240 which operates the poppet open-and-close valve 245 which introduces gas pressure into the chamber rearwardly of the piston portion 179 forcing the valve sleeve 167 forwardly. The poppet light 237 will go out at this time, indicating to the operator at his remote position that the nozzle poppet is open since the poppet sleeve 167 has moved forwardly thus breaking the circuit at the poppet closed switch 197a. During the filling operation as mentioned above, the ambient air and moisture cannot touch the surfaces of the attaching mechanism which move relative to each other because of the bellows 211 and the seal 234 which, with a portion of the removing slider 203, are means which enclose the attaching mechanism from the ambient air.

After the tank to be filled has been filled to the desired amount, the nozzle poppet is closed by opening switch 240 which reactuates the poppet open-and-close solenoid operated valve 245 and thereby venting the chamber rearwardly of piston portion 179, and operating gases again are forced into the chamber forwardly of piston portion 179 forcing this portion, and consequently the nozzle poppet sleeve 167, rearwardly to close the nozzle poppet valve. When the nozzle poppet sleeve 167 has reached its rearwardly closed position, the contacts of switch 197a should again be closed and the poppet light 237 should lightup on the operator's remote control panel if the valve plate 196 has returned to its closed position with the nozzle poppet 191. If the poppet light 237 becomes relighted when switch 240 is open, the operator will know that it is safe to disconnect the nozzle from the valve; however, if the light 237 does not become relighted, the operator knows that either the valve plate 196 has not returned to its closed position or the nozzle poppet 191 has not returned to its closed position. In this case, it is unsafe to disconnect the nozzle and therefore the operator closes switch 240 again which will cause the poppet sleeve 167 to run forward, and the shock of the poppet 191 hitting the valve plate 196 will generally jar the valve plate loose so that it will return to its closed position by action of the springs 221 as the poppet 191 is moved to its rearward closed position.

In order to disconnect the nozzle, the operator opens switches 241 and 239, whereby the locking solenoid operated valve and the nozzle advance solenoid operated valve 246 and 244, respectively, are operated thereby venting the pressure in the locking chamber 201 through the line 201a and the pressure within the chamber rearwardly of the piston portion 174 through the line 175, and pressure is injected through line 249 to lines 176 and 204a and pressurizes the chamber forward of the piston portion 174 and the removing chamber 204 respectively. As can be seen, the nozzle will push itself away from the valve. While the gas pressure in the removing chamber 204 moves the locking slider 200 rearwardly to release the holding detents 209 the rearward movement and force is transmitted to the body on impact in addition to the force of the gas pressure within the bellows 211 which also tends to force the body rearwardly away. In addition to that, the gas pressure in the chamber forwardly of the piston portion 174 tends to move the whole nozzle rearwardly away from the valve relative to the frame sleeve 162.

By comparing the attachment mechanism portion of the first and second modification of the subject invention, it is seen that the two modifications are very similar, and portions of the first modification could be used with portions of the second modification and vice versa. For instance, the tapered locking mechanism of the second modification could be used with the first modification of the nozzle. Also, the first modification of the nozzle could be adapted to be able to be connected from a remote position by using the attaching mechanism of the second modification and some sort of means to move the nozzle into connecting relation with the particular valve involved. Further, it should be appreciated that while the invention is particularly useful for handling extremely cold fluids or other types of fluids in hazardous ambient conditions, it is applicable to any apparatus for handling fluids, and that although only a few forms of the invention have been shown and described it will be apparent to those skilled in the art that the invention is not so limited but that various modifications may be made therein without deviating from the spirit of the invention or the scope of the appended claims.

We claim:

1. A fluid nozzle to be attached to a valve through which fluid is to be passed comprising a body having a flow passage for fluid therethrough, said body having attaching means mounted thereon for attaching and disconnecting said nozzle to and from a valve, said attaching means having holding means movable between a release and a holding position for engaging and holding the nozzle to the valve, said attachment means having actuating means for moving said holding means into holding position, said actuating means and said attaching means having surfaces which move longitudinally relative to each other, and enclosing means fixedly connected to and encircling said attaching means for preventing ambient air and moisture from contacting said surfaces of the actuating and holding means which move relative to each other.

2. A fluid nozzle to be attached to a valve through which fluid is to be passed comprising a body having a flow passage for fluid therethrough, said body having attaching means mounted thereon for attaching and disconnecting said nozzle to and from a valve, means connected to said attaching means for controlling said attaching means from a remote position, said attaching means having surfaces which move longitudinally relative to each other, and fixedly secured enclosing means for keeping the ambient air and moisture from contacting said surfaces on said attaching means.

3. A fluid nozzle to be attached to a valve through which fluid is to be passed comprising a frame, a body sleeve slidably mounted to said frame, means to move said body sleeve relative to said frame, a valve sleeve slidably mounted within said body sleeve, a nozzle valve member mounted to said valve sleeve, means to move said valve sleeve relative to said body sleeve, attaching means having juxtaposed movable contacting members for attaching said nozzle to a valve, means for remotely actuating said attaching means, encircling means for preventing ambient air and moisture from contacting said attaching members whereever they contact each other.

4. A remotely operable fluid nozzle comprising a body having a flow passage therethrough, nozzle valve means for controlling flow in said passage, attachment means mounted to said body for attaching said nozzle to a valve, said attachment means having holding means at its forward end movable longitudinally between a release and a holding position for engaging said valve and securing the nozzle thereto, said attachment means having manually operable actuating means for moving the holding means from the release to the holding position, said actuating means being operable from a remote position, said attachment means also having removing means connected to said actuating means for moving said actuating means to a position where the holding means may move to the release position, said removal means being adapted to push said nozzle away from said valve.

5. The nozzle, as claimed in claim 4, wherein the holding means includes a locking detent retaining ring having a plurality of locking detents movable between a release position within said ring and a holding position wherein at least a portion of said detents project externally of said ring and are adapted to engage a portion of the valve to thereby hold the nozzle to the valve, and the inner surface of said retaining ring is shaped as two adjacent forwardly and outwardly extending conical surfaces with said detents being mounted in said ring at the portion of the ring between said conical surfaces.

6. A remote disconnect liquid nozzle comprising a body having a flow passage for liquid therein, said body having a nozzle attachment mechanism portion at its forward end, said mechanism portion including an insulating sleeve, a heat generating means disposed outwardly of said sleeve, a locking slider slidably mounted around said heat means, means normally urging said slider forwardly, holding means movable between a release and a holding position located at the forward end of said mechanism portion for holding said nozzle to a valve, said locking slider having means cooperating with said movable holding means to move said last-mentioned means into holding position when the locking slider is forwardly, and removing means located around said locking slider for urging said slider rearwardly.

7. A remote disconnect liquid nozzle comprising a body having a flow passage for liquid therein, said body having a nozzle attachment mechanism portion at its forward end, said mechanism portion including an insulating sleeve, a heat generating means disposed outwardly of said sleeve, a locking slider slidably mounted around said heat means, means normally urging said slider forwardly, holding means movable between a release and a holding position located at the forward end of said mechanism portion for holding said nozzle to a valve, said locking slider having means cooperating with said movable holding means to move said last-mentioned means into holding position when the locking slider is forwardly, removing means located around said locking slider for urging said slider rearwardly, remotely operable means to operate said removing means, and flexible shielding means extending circumferentially between said body and said removing means whereby ambient air and moisture cannot contact surfaces of the mechanism which move relative to each other.

8. A fluid nozzle comprising a body having a flow passage for fluid therein, said body having an attachment mechanism portion near its forward end, nozzle valve means located within said passage for regulating the flow of a fluid through said nozzle, a double concentric walled insulating sleeve surrounding said passage in the area of said mechanism portion, a plurality of detents movably mounted in said attachment portion near the forward end of said portion, said detents being movably mounted between a release and a holding position, a locking slider slidably mounted adjacent the outside surface of said insulating sleeve, said slider having a camming means for moving said detents into locked position, a removing slider slidably mounted around said locking slider, removing means between said locking slider and said removing slider to urge said locking slider rearwardly relative to said removing slider when desired, and flexible container means around said mechanism portion for containing a dry gas.

9. A fluid nozzle, as claimed in claim 8 wherein a magnetic responsive switch is mounted in said nozzle valve means, and interlock means are provided electrically connected to said magnetic switch and said removing means to prevent said removing means from operating in absence of a signal from said switch.

10. A remotely operable fluid handling nozzle comprising a body having a flow passage for fluids therethrough, nozzle valve means located within said passage for regulating the flow of fluid through said nozzle, said body having an attachment mechanism portion near its forward end, movable holding means at the forward end of said attachment mechanism portion for holding said nozzle to a valve through which fluid is to be passed, said holding means being movably mounted between a release position and a holding position, locking means operable from a remote position engaging said holding means for moving said means into holding position, removal means communicating with said locking means for simultaneously moving said locking means in order to allow the holding means to return to the release position and pushing said nozzle away from a valve to which the nozzle is attached, means to prevent said removal means from being operated if said nozzle valve means is open, and flexible shielding means circumferentially extending between said body and said removing means for preventing ambient moisture and air from contacting the body, the locking means and the removing means wherever they movably contact each other.

11. A fluid nozzle comprising a frame, a body sleeve slidably mounted to said frame, means to axially move said body sleeve in relation to said frame, at least a portion of the wall of said body sleeve being hollow and evacuated, a valve sleeve slidably mounted within said body sleeve and adapted for fluid flow therethrough; attachment mechanism including holding detents movably mounted in a forward position of said body sleeve from a release to a holding position, locking means engaging said detents for moving said detents from the release to the holding position when moved in a first direction, a removing slider encircling said locking means, remotely operable means for simultaneously urging said removing slider forwardly and said locking means in a second direction opposite to said first direction whereby said detents are released from the holding position, a connect actuator sleeve fixedly mounted to said body sleeve and encircling said removing slider, means for moving said removing slider rearwardly relative to said body sleeve and urging said locking means in said second direction, bellows encircling said removing slider, said bellows fixedly mounted to the removing slider at a first portion and fixed by mounted said body at a second portion forming an enclosure whereby the ambient moisture and air cannot contact the sliding surfaces on the attaching mechanism.

12. A fluid nozzle comprising a frame, a body sleeve slidably mounted to said frame, means to axially move said body sleeve in relation to said frame, at least a portion of the wall of said body sleeve being hollow and evacuated, a valve sleeve slidably mounted within said body sleeve and adapted for fluid flow therethrough, a holding detent retainer ring mounted at the forward end of said body sleeve, detents movably mounted in said ring from a locking position to an unlocking position, a heater sleeve encircling and mounted to the body sleeve, a locking slider encircling said heater sleeve and having a forwardly facing operating surface on its outside, said locking slider having a forwardly and inwardly facing operating surface at its forward end for moving said movable detents from a release to holding position, means normally urging said locking slider forward, a removing slider encircling said locking slider, said removing slider having a rearwardly facing operating surface on its interior located facing said operating surface on said locking slider forming a circumferential removing chamber between said locking slider and said removing slider, remotely controlled means to introduce fluid pressure into said removing chamber for urging said locking slider rearwardly relative to said removing slider whereby said detents are released from the holding position, a connect actuator sleeve fixedly mounted to said body sleeve and encircling said removing slider, said connect sleeve having an inwardly extending rearwardly facing operating surface, said removing slider having an outwardly extending forwardly facing operating surface forming facing said connect sleeve operating surface forming a circumferential connect actuating chamber, means for introducing fluid pressure into said last-mentioned chamber for moving said removing slider rearwardly relative to said body sleeve and thereby urge said locking slider rearwardly, bellows encircling said removing slider, said bellows fixedly mounted to the removing slider at a first portion and fixedly mounted on said body sleeve at a second portion forming an enclosure whereby the ambient moisture and air cannot contact the sliding surfaces on the attaching mechanism.

13. In combination with a poppet-type valve having a detent receiving ring around the valve plate, a fluid nozzle comprising a body having a flow passage for fluid therein, said body having an attachment portion at its forward end, an insulation sleeve in said attachment portion, holding detents in said attachment portion movably mounted between a release and a holding position engaging said valve retaining ring, a locking slider slidably mounted in said attachment portion having means for moving said detents from the release to holding position, said locking slider being relieved to form a locking chamber and having a rearwardly facing operating surface to receive any pressure in said chamber, means in said locking chamber normally urging said locking slider forwardly relative to said body, said locking slider being relieved at its forward end on its outer side and having an outwardly extending forwardly facing operating surface, a removing slider slidably mounted around said locking slider, said removing slider being relieved on its inner side and having an inwardly extending rearwardly facing operating surface forming, with said locking slider, a removing chamber, means to pressurize said removing chamber from a remote position, means tending to urge said locking slider rearwardly relative to said removing slider, sealing means between said valve detent receiving ring and said removing slider, and bellows circumferentially extending between said body and said removing slider enclosing the sliding surfaces of said sliders whereby the ambient air and moisture cannot contact the surfaces of the nozzle which move relative to each other.

14. In combination with a poppet-type valve having a detent receiving ring around a valve plate, a fluid nozzle comprising a body having a flow passage for fluid therein, said body having an attachment portion at its forward end, and insulation sleeve in said attachment portion formed of an inner wall which forms part of the wall of the flow passage and a concentric spaced outer wall with the space therebetween being evacuated, a holding detent retaining ring mounted at the forward end of said attachment portion, holding detents in said detent retaining ring movably mounted between a release and a holding position engaging said detent receiving ring, sealing means extending in the joint between the detent retaining ring and valve retaining ring for preventing the fluid from the flow passage contacting said detents, a heater sleeve mounted around said insulation sleeve, a locking slider slidably mounted around said heater sleeve having a forwardly and an inwardly facing camming surface engaging said detents for moving said detents from the release to holding position, said locking slider being relieved on its inner side and having an inwardly extending rearwardly facing operating surface, and said heater sleeve having an outwardly extending forwardly facing operating surface at a rearward portion forming a locking chamber, means to inject pressure into said locking chamber for urging said locking slider forwardly relative to said body, means in said locking chamber resiliently restraining said locking slider from rearward movement relative to said body, said locking slider being relieved at its forward end on its outer side and having an outwardly extending forwardly facing operating surface, a removing slider slidably mounted around said locking slider, said removing slider being relieved on its inner side and having an inwardly extending rearwardly facing operating surface forming, with said locking slider, a removing chamber, means to pressurize said removing chamber from a remote position, means in said removing chamber tending to urge said locking slider rearwardly relative to said removing slider, sealing means between said detent receiving ring and said removing slider, and bellows circumferentially extending between said body and said removing slider enclosing the abutting sliding surfaces of said sliders whereby the ambient air and moisture cannot contact the surfaces of the nozzle which move relative to each other.

15. In combination with a poppet-type valve having a holding means receiving ring around a valve plate, a fluid nozzle comprising a body having a flow passage for fluid therein, nozzle valve means in said flow passage for regulating flow, said body having an attachment portion at a forward portion, an insulation sleeve in said attachment portion, holding means in said attachment portion movably mounted between a release and a holding position engaging said receiving ring, means retaining said holding means in said holding position, control means for operating said locking means from a remote location to release said holding means, interlock means for preventing said control means from releasing said holding means when said nozzle valve means is open, said locking slider being relieved at its forward end on its outer side and having an outwardly extending forwardly facing operating surface, a removing slider slidably mounted around said locking slider, said removing slider being relieved on its inner side and having an inwardly extending rearwardly facing operating surface forming with said locking slider, a removing chamber, means to pressurize said removing chamber from a remote position, means tending to urge said locking slider rearwardly relative to said removing slider, sealing means between said valve retaining ring and said removing slider, and enclosing means circumferentially extending between said body and said removing slider enclosing the sliding surfaces of said sliders, means for supplying gas into the space enclosed by said enclosing means, whereby the ambient air and moisture cannot contact the surfaces of the nozzle which move relative to each other.

16. The fluid nozzle, as claimed in claim 15 wherein the interlock means prevents the control means from releasing the holding means if the valve plate is not sealed to the receiving ring.

References Cited in the file of this patent

UNITED STATES PATENTS

| 2,520,501 | Guiler et al. | Aug. 29, 1950 |
| 2,565,872 | Melsheimer | Aug. 28, 1951 |
| 2,638,916 | Scheiwer | May 19, 1953 |
| 2,793,058 | Jacobson | May 21, 1957 |